United States Patent
Martin et al.

(10) Patent No.: US 8,971,329 B1
(45) Date of Patent: *Mar. 3, 2015

(54) SYSTEM AND METHOD FOR ORDERING OF DATA TRANSFERRED OVER MULTIPLE CHANNELS

(75) Inventors: Randal G. Martin, San Jose, CA (US); Steven C. Miller, Livermore, CA (US); Mark D. Stadler, Mountain View, CA (US); David A. Kruckemyer, Mountain View, CA (US)

(73) Assignee: Silicon Graphics International Corp., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/273,453

(22) Filed: Nov. 18, 2008

Related U.S. Application Data

(63) Continuation of application No. 09/910,587, filed on Jul. 20, 2001, now Pat. No. 7,453,878.

(60) Provisional application No. 60/219,915, filed on Jul. 21, 2000.

(51) Int. Cl.
 *H04L 12/28* (2006.01)
 *H04L 12/861* (2013.01)

(52) U.S. Cl.
 USPC .......................................... 370/394; 370/413

(58) Field of Classification Search
 USPC ......... 370/229, 230, 231, 235, 236, 394, 412, 370/437, 465, 389, 413, 428, 429, 52, 370/395.4, 395.7, 395.71
 See application file for complete search history.

(56) References Cited

U.S. PATENT DOCUMENTS

| | | | | |
|---|---|---|---|---|
| 4,703,475 A * | 10/1987 | Dretzka et al. | | 370/394 |
| 5,222,061 A * | 6/1993 | Doshi et al. | | 370/394 |
| 5,754,754 A * | 5/1998 | Dudley et al. | | 714/18 |
| 5,825,748 A | 10/1998 | Barkey et al. | | |
| 6,072,797 A * | 6/2000 | Fletcher | | 370/394 |
| 6,154,794 A | 11/2000 | Abdalla et al. | | |
| 6,243,358 B1 | 6/2001 | Monin et al. | | |
| 6,246,684 B1 | 6/2001 | Chapman et al. | | |
| 6,366,989 B1 * | 4/2002 | Keskar et al. | | 711/167 |
| 6,594,701 B1 | 7/2003 | Forin | | |

(Continued)

OTHER PUBLICATIONS

U.S. Appl. No. 09/910,587 Final Office Action mailed Oct. 9, 2007.

(Continued)

*Primary Examiner* — Michael Thier
*Assistant Examiner* — Feben M Haile
(74) *Attorney, Agent, or Firm* — Lewis Roca Rothgerber LLP

(57) ABSTRACT

A multiple channel data transfer system (10) includes a source (12) that generates data packets with sequence numbers for transfer over multiple request channels (14). Data packets are transferred over the multiple request channels (14) through a network (16) to a destination (18). The destination (18) re-orders the data packets received over the multiple request channels (14) into a proper sequence in response to the sequence numbers to facilitate data processing. The destination (18) provides appropriate reply packets to the source (12) over multiple response channels (20) to control the flow of data packets from the source (12).

17 Claims, 2 Drawing Sheets

(56) References Cited

U.S. PATENT DOCUMENTS

| | | | |
|---|---|---|---|
| 6,788,686 B1 * | 9/2004 | Khotimsky et al. | 370/394 |
| 6,810,428 B1 | 10/2004 | Larsen et al. | |
| 6,944,173 B1 * | 9/2005 | Jones et al. | 370/413 |
| 7,061,929 B1 * | 6/2006 | Eberle et al. | 370/423 |
| 7,269,666 B1 * | 9/2007 | Leitner et al. | 709/250 |
| 7,453,878 B1 * | 11/2008 | Martin et al. | 370/394 |
| 2004/0049612 A1 | 3/2004 | Boyd et al. | |

OTHER PUBLICATIONS

U.S. Appl. No. 09/910,587 Office Action mailed Apr. 20, 2007.
U.S. Appl. No. 09/910,587 Office Action mailed Oct. 10, 2006.
U.S. Appl. No. 09/910,587 Final Office Action mailed Jun. 21, 2006.
U.S. Appl. No. 09/910,587 Office Action mailed Jan. 12, 2006.
U.S. Appl. No. 09/910,587 Final Office Action mailed Jul. 18, 2005.
U.S. Appl. No. 09/910,587 Office Action mailed Feb. 9, 2005.

* cited by examiner

SYSTEM AND METHOD FOR ORDERING OF DATA TRANSFERRED OVER MULTIPLE CHANNELS

RELATED APPLICATIONS

This is a continuation application of U.S. application Ser. No. 09/910,587 and now U.S. Pat. No. 7,453,878, which claims the benefit of U.S. Provisional Application No. 60/219,915, all of which are incorporated herein by reference.

TECHNICAL FIELD OF THE INVENTION

The present invention relates in general to computer information processing and more particularly to a system and method for ordering data transferred over multiple channels.

BACKGROUND OF THE INVENTION

Conventional data transfer schemes may provide flow control for a single channel. However, these schemes do not address the issue of splitting a transfer over multiple physical or virtual channels. In environments where the ordering of the data is important, splitting the data transfer over multiple channels may cause the data to sent in an order different from originally desired. For example, graphics systems may require the processing of data in a certain order to effectively generate an image for display that reflects the intended scene to be viewed. The destination will not be able to effectively process the data since it is received in a different order than when it was generated. Therefore, it is desirable to have a capability to re-order the data at the destination despite the use of multiple channels for data transfer.

SUMMARY OF THE INVENTION

From the foregoing, it may be appreciated by those skilled in the art that a need has arisen for a technique that can re-order data at a destination after the data has been transferred over multiple channels while providing flow control for the data transfer. In accordance with the present invention, a system and method for ordering data transferred over multiple channels are provided that substantially eliminate or greatly reduce disadvantages and problems associated with conventional data transfer techniques.

According to an embodiment of the present invention, there is provided a method for ordering data transferred over multiple channels that includes generating a data packet in response to a flow control credit. A sequence number is generated and inserted into the data packet. One of a plurality of channels to transfer the data packet is selected and the data packet is transferred over the selected one of the plurality of channels.

The present invention provides various technical advantages over conventional data transfer techniques. For example, one technical advantage is to associate a sequence number to data packets so that they can be placed into the proper sequence at the destination. Another technical advantage is to place data packets received from a source in an appropriate sequence despite transferring the data packets over multiple channels. Yet another technical advantage is to integrate re-ordering of data packets with flow control of the data packet transfer. Other examples may be readily ascertainable by those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
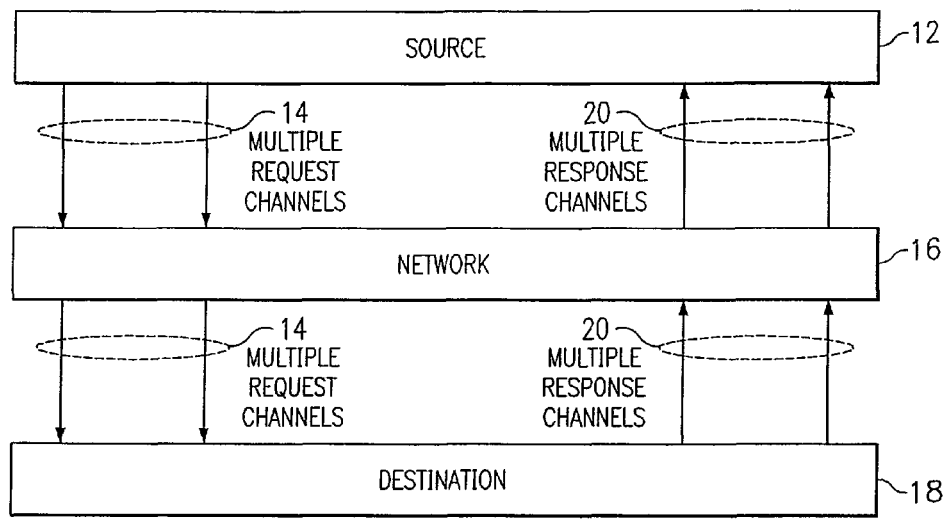
FIG. 1 illustrates a block diagram of a multiple channel data transfer system.

FIG. 1 is a block diagram of a multiple channel data transfer system 10. System 10 includes a source 12 that generates data packets for transfer over multiple request channels 14. Data packets are transferred over multiple request channels 14 through a network 16 to a destination 18. Destination 18 processes the data packets received over multiple request channels 14 and provides appropriate response packets to source 12 over multiple response channels 20 through network 16. In an exemplary scenario, system 10 may be a graphics system wherein source 12 is a node with one or more processors generating data packets and destination 18 is a graphics processor that generates images in response to the data packets. Multiple request channels 14 are needed as the amount of data generated by a processor of the node may exceed the bandwidth of a single channel. Network 16 may be any data transfer medium that may include one or more of a local area network, wide area network, Ethernet network, Internet, or any conventional network for transferring data.

Each data packet generated at source 12 may be placed onto any available one of the multiple request channels 14. For each data packet, source 12 determines an available channel according to capacity and flow control instructions. Examples of flow control implementations in single channel systems can be found in co-pending U.S. application Ser. No. 09/409,805 and U.S. Pat. No. 6,154,794, which are each hereby incorporated by reference herein. In a multi-channel implementation, a first packet may be sent on a first channel and a second packet may be sent on another channel. Because data packets may be sent on different channels, destination 18 may receive and buffer the second packet before the first packet even though the first packet was generated prior to generation of the second packet. Since the processing of data packets in the correct order is important, destination 18 needs to recognize that the first packet is to be processed before the second packet.

Figure 2:
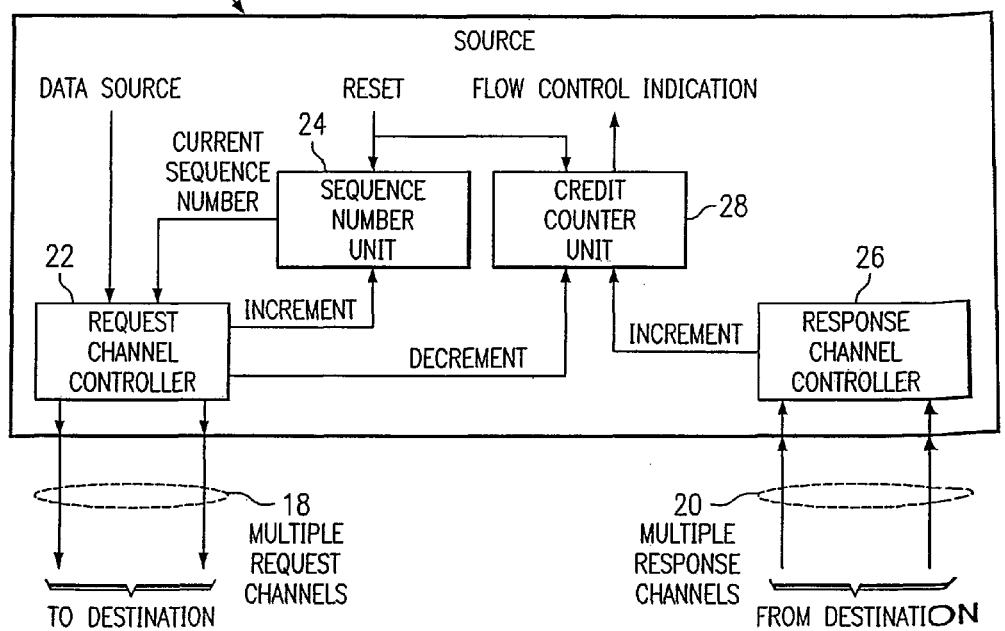
FIG. 2 illustrates a block diagram of a source for data packet generation in the multiple channel data transfer system.

FIG. 2 shows a block diagram for the generation of data packets at source 12. Source 12 includes a source request channel controller 22, a sequence number unit 24, a response channel controller 26, and a credit counter unit 28. Source request channel controller 22 generates data packets from data received from a data source, such as a processor, in source 12 and selects among multiple request channels for the transferring of the data packets. Alternatively, the data source may provide the data in packet form for transfer by source request channel controller 22.

Source request channel controller 22 inserts a sequence number as provided by sequence number unit 24 for each generated data packet. The sequence number is used by destination 18 in order to re-order the received data packets into the proper sequence. Upon inserting a sequence number into a data packet, source request channel controller 22 transfers the data packet onto a selected one of multiple request channels 14. Source request channel controller 22 issues an increment command to sequence number unit 24 so that the current sequence number provided by sequence number unit 24 to source request channel controller 22 is advanced to the next number in the sequence. The sequence number may be reset by the data source for each block of data to be transferred.

Source request channel controller 22 also issues a decrement command to credit counter unit 28 to indicate that a credit was used in transferring the data packet over the selected one of the multiple request channels 14. Credit counter unit 28 is initialized with a number of credits by a reset signal from the data source. The number of credits is decremented after transfer of each data packet from source request channel controller 22. Credit counter unit 28 provides a flow control indication to the data source to control the amount of data provided by the data source. As long as the number of credits is above a desired threshold value, the flow control indication informs the data source that it may continue to provide data. If the number of credits falls below the desired threshold value, the flow control indication informs the data source to cease providing data until the desired threshold value is again exceeded. The data source may force an interrupt to do a context switch in order that other tasks may be performed in the event that the flow control indication maintains the data cessation status for a certain period of time. The data source will then return to the transfer of data packets. The number of credits is incremented in response to response channel controller 26 receiving a reply from destination 18 over one of multiple response channels 20. The reply includes a credit indicating that destination 18 has processed a data packet and has capability to receive another data packet.

Figure 3:
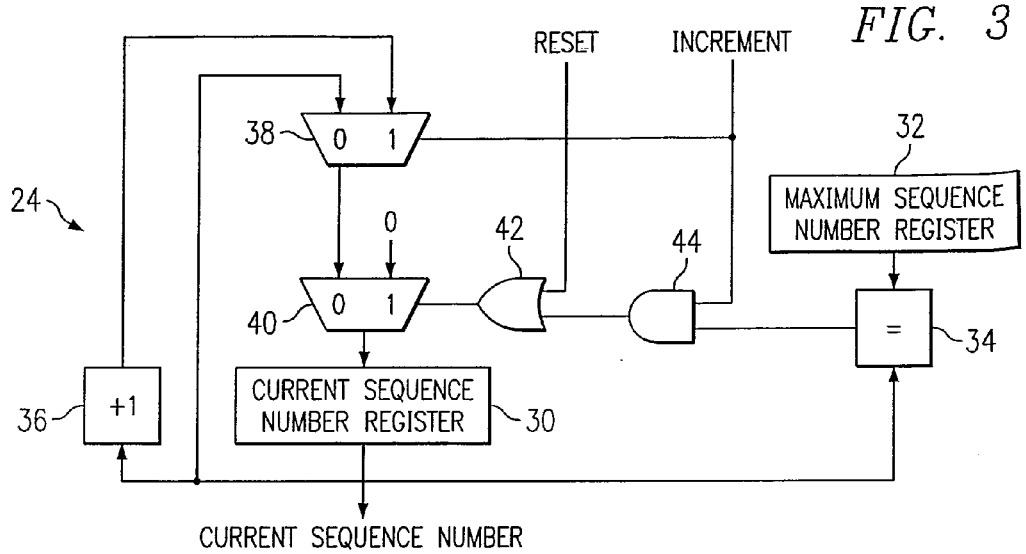
FIG. 3 illustrates a block diagram of a sequence number unit in the source.

FIG. 3 shows a block diagram of sequence number unit 24. Sequence number unit 24 includes a current sequence number register 30, a maximum sequence number register 32, comparator 34, increment unit 36, increment selectors 38 and 40, reset logic 42, and increment logic 44. Upon initialization, a reset signal from the data source causes a sequence number value of zero to be loaded into current sequence number register 30. Increment selector 38 receives the value in current sequence number register 30 and an incremented sequence number value from increment unit 36. Increment counter 38 provides the value from current sequence number register 30 to increment selector 40 unless an increment signal has been received from source request channel controller 22 indicating that a data packet with the value in current sequence number register 30 has been transferred. Increment selector 40 provides the value in current sequence number register 30 back thereto unless a reset signal is received from the data source or an increment signal is received from source request channel controller 22. The reset signal causes the zero value to be loaded into current sequence number register 30. The increment signal causes an incremented value to flow through increment selectors 38 and 40 for loading into current sequence number register 30.

Current sequence number register 30 may also be loaded with the zero value according to a maximum value in maximum sequence number register 32. The value in current sequence number register 30 is compared to the value in maximum sequence number register 32 at comparator 34. If these values are equal, comparator 34, through increment logic 44 and reset logic 42, causes the zero value at increment selector 40 to be loaded into current sequence number register 30. In this manner, a large data packet group may be accommodated without loss of packet ordering since sequence numbers will be freed up and available for re-use once a data packet has been processed. Current sequence number register 30 and maximum sequence number register 32 may be programmable to provide a range of sequence numbers to simplify buffering at destination 18. Also, the programmable nature of these registers allows for varying the size of buffers receiving data packets at destination 18.

Figure 4:
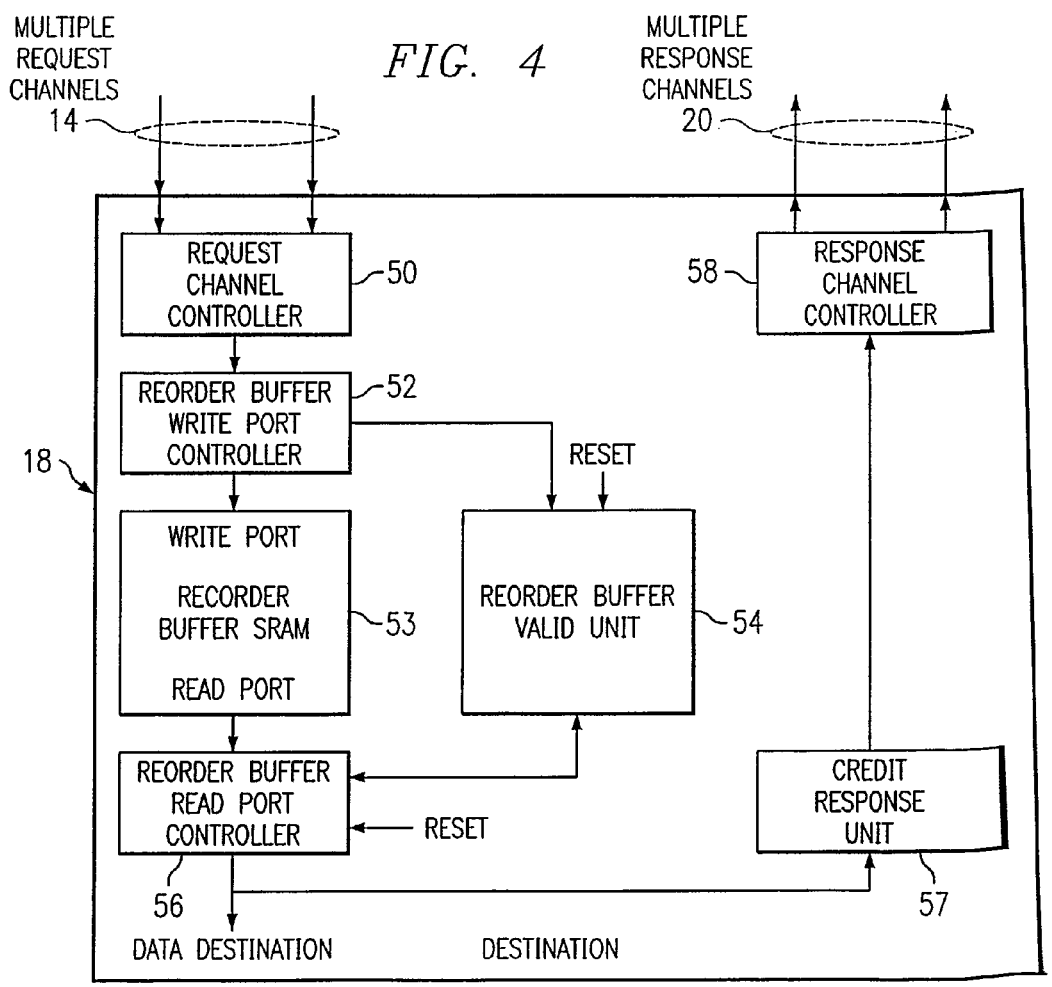
FIG. 4 illustrates a block diagram of a destination for processing data packets in the multiple channel data transfer system.

FIG. 4 shows the processing performed at destination 18. Destination 18 includes a destination request channel controller 50, a re-order buffer write port controller 52, a re-order buffer 53, a re-order buffer valid bit unit 54, a re-order buffer read port controller 56, a credit response unit 57, and a destination response channel controller 58. In operation, destination request channel controller 50 receives data packets from source 12 over multiple request channels 14. Destination request channel controller 50 provides the data packets to a re-order buffer write port controller 52. Ordering of data packets is not guaranteed over multiple request channels 14. To regain the proper ordering of the data packets, re-order buffer write port controller 52 uses the sequence numbers in the data packets to directly index into re-order buffer 53 through its write port. Re-order buffer valid bit unit 54 maintains a valid bit for each portion of re-order buffer 53. When re-order buffer write port controller 52 causes data packets to be stored in re-order buffer 53, a corresponding valid bit is set. Re-order buffer read port controller 56 monitors the valid bits. When a next sequential valid bit is set, the data packets associated with the immediately preceding valid bit in the corresponding portion of re-order buffer are read from its read port and provided to a data destination. Once the data packets have been read from re-order buffer 53, the corresponding valid bit is cleared. All valid bits may be cleared in response to a reset signal. Through use of the sequence numbers, data packets are read from re-order buffer 53 in their original order of generation. As packets are read from re-order buffer 53, credit response unit 57 returns flow control credits back to source 12 through destination response channel controller 58 over multiple response channels 20.

Thus, it is apparent that there has been provided, in accordance with the present invention, a system and method for ordering data transferred over multiple channels that satisfies the advantages set forth above. Although the present invention has been described in detail, it should be understood that various changes, substitutions, and alterations may be made herein. For example, the functionality for providing sequence numbers and flow control credits may be performed in any number of ways other than the implementation described above for appropriate sequence number and credit processing. Other examples may be readily ascertainable by those skilled in the art and may be made herein without departing from the spirit and scope of the present invention as defined by the following claims.

What is claimed is:

1. A method for ordering data transferred over multiple channels, comprising:

receiving a plurality of data packets of a particular packet flow over different ones of a plurality of channels, each data packet including a respective sequence number, the plurality of data packets being received in a non-sequential order;

storing each of the plurality of data packets in a buffer according to its respective sequence number;

reading a first one of the plurality of data packets from the buffer according to its respective sequence number in response to storing in the buffer a second one of the plurality of data packets having an adjacent subsequent sequence number, in order to read the plurality of data packets in a sequential order;

setting a valid bit associated with data packets of the plurality of data packets in response to the data packets being stored in the buffer, wherein the valid bit is the next sequential valid bit relative to an immediately preceding valid bit; and clearing the immediately preceding valid bit in response to data packets associated with the immediately preceding valid bit being read from the buffer.

2. The method of claim 1, further comprising:

monitoring valid bits to identify that the data packets is ready to be read.

3. The method of claim 1, further comprising:

reading the data packets from the buffer in response to the setting of the valid bit associated with the data packets, wherein clearing the valid bit associated with the data packets is in response to the data packets being read from an associated portion of the buffer.

4. The method of claim 3, further comprising:

reading a next sequential data packets to the data packets upon setting of a valid bit associated with the next sequential data packets.

5. The method of claim 1, wherein the sequence number is used to directly index into the buffer.

6. The method of claim 1, further comprising:

generating a flow control credit for each data packet read from the buffer.

7. The method of claim 6, further comprising:

transmitting each flow control credit to a source of the plurality of packets.

8. A non-transitory computer readable medium having embodied thereon a program executable by a processor for ordering data transferred over multiple channels, the executable code operable to cause one or more processors to:

receive a plurality of data packets of a particular packet flow over different ones of a plurality of channels, each data packet including a respective sequence number, the plurality of data packets being received in a non-sequential order;

store each of the plurality of data packets in a buffer according to its respective sequence number;

read a first one of the plurality of data packets from the buffer according to its respective sequence number in response to storing in the buffer a second one of the plurality of data packets having an adjacent subsequent sequence number, in order to read the plurality of data packets in a sequential order;

set a valid bit associated with data packets in response to the data packets associated with an immediately preceding valid bit being stored in the buffer, wherein the valid bit is the next sequential valid bit relative to the immediately preceding valid bit; and clear the immediately preceding valid bit in response to the data packets associated with the immediately preceding valid bit being read from the buffer.

9. The non-transitory computer readable medium of claim 8, wherein the executable code is further operable to cause the processors to:

monitor valid bits to identify that the data packets are ready to be read.

10. The non-transitory computer readable medium of claim 8, wherein the executable code is further operable to cause the processors to:

read the data packets from the buffer in response to the setting of the valid bit associated with the data packets, wherein clearing the valid bit associated with the data packets is in response to the data packets being read from an associated portion of the buffer.

11. The non-transitory computer readable medium of claim 10, wherein the executable code is further operable to cause the processors to:

read next sequential data packets to the data packets upon setting of the valid bit associated with the next sequential data packets.

12. The non-transitory computer readable medium of claim 8, wherein the sequence number is used to directly index into the buffer.

13. The non-transitory computer readable medium of claim 8, wherein the executable code is further operable to cause the processors to:

generate a flow control credit in response to each data packet being read from the buffer;

and to transmit each flow control credit to a source of the plurality of packets.

14. A system for ordering data transferred over multiple channels, the system comprising:

a processor;

a buffer; and a memory for storing instructions which when executed from the memory cause the processor to:

receive a plurality of data packets of a particular packet flow in a non-sequential order over different ones of a plurality of channels, each data packet including a respective sequence number, store each of the plurality of data packets according to its respective sequence number in the buffer, read a first one of the plurality of data packets stored in the buffer according to its respective sequence number in response to storing in the buffer a second one of the plurality of data packets having an adjacent subsequent sequence number, in order to read the plurality of data packets in a sequential order, set a valid bit associated with data packets in response to the data packets associated with an immediately preceding valid bit being stored in the buffer, wherein the valid bit is the next sequential valid bit relative to the immediately preceding valid bit, and clear the immediately preceding valid bit in response to the data packets associated with the immediately preceding valid bit being read from the buffer.

15. The system of claim 14, wherein the data packets are read from the buffer in response to the setting of the valid bit associated with the data packets, and wherein the valid bit associated with the data packets is cleared in response to the data packets being read from an associated portion of the buffer.

16. The system of claim 15, wherein next sequential data packets to the data packet is read upon setting of the valid bit associated with the next sequential data packets.

17. The system of claim 14, wherein the sequence number is used to directly index into the buffer.

* * * * *